United States Patent Office 3,477,991
Patented Nov. 11, 1969

3,477,991
ALKENYL HINDERED PHENOL AND A COPOLYMER OF AN ALKENYL PHENOL AND A MONOOLEFIN
Tad L. Patton and Joseph T. Horeczy, Baytown, Tex., and Delos E. Bown, White Plains, N.Y., assignors to Esso Research and Engineering Company
No Drawing. Continuation-in-part of application Ser. No. 540,849, Apr. 7, 1966. This application June 5, 1968, Ser. No. 734,552
Int. Cl. C08f *15/10, 1/32*
U.S. Cl. 260—47
10 Claims

ABSTRACT OF THE DISCLOSURE

Novel alkenyl hindered phenols having tertiary alkyls-ortho of the hydroxyl group and an omega-alkenyl para to the hydroxyl group are effective monomers to polymerize with alpha-olefins in the presence of an organo-metal-transition metal catalyst (a Ziegler-type catalyst) to produce new and useful copolymers.

CROSS REFERENCE TO RELATED APPLICATIONS

This application is a continuation-in-part application of Ser. No. 540,849, filed Apr. 7, 1966, now abandoned entitled "Copolymerization."

BACKGROUND OF THE INVENTION

Polymers produced by the polymerization of alpha-olefins with an organo-metal transition metal catalyst (a Ziegler-type catalyst) have heretofore been prepared which are useful in a number of applications. Heretofore, the polymerization of alpha-olefins with a Ziegler-type catalyst to form polymers of high molecular weights and characteristics which have commercial importance have been formed expressed in the absence of polar compounds due to the adverse effect such polar compounds have on the catalyst.

It is an object of the present invention to produce alkenyl phenols wherein the polar hydroxyl group is sterically hindered so that the alkenyl phenols will polymerize with alpha-olefins when employing a Ziegler-type catalyst.

SUMMARY OF THE INVENTION

The present invention is directed to the synthesis of alkenyl phenols wherein the polar hydroxyl group is sterically hindered. Further, the present invention may be briefly described as directed to the copolymerization of an alpha-olefin with these alkenyl hindered phenols in the presence of an organo-metal-transition metal catalyst to produce new and useful copolymers. It was found that the alkenyl hindered phenols employed have sufficient steric hindrance around the hydroxyl group so that the polar hydroxyl group and the Ziegler-type catalyst do not react to deactivate the catalyst.

DESCRIPTION OF THE PREFERRED EMBODIMENT

The use of a Ziegler-type catalyst in the polymerization of alpha-olefins to form homopolymers and certain copolymers such ethylene-propylene and ethylene-butene is well known. An organo-metal-transition metal catalyst (a Ziegler-type catalyst) is defined for the purpose of this application as a transition metal compound of Group IV, V, VI, or VIII of the Periodic Table which is at least partialy reduced and an organo-metallic compound of a metal selected from an alkali metal, an alkaline earth metal, zinc or aluminum. The transition metal compound may be reduced by means of chemical reaction such as using the organo-metallic compound as a reducing agent (e.g., Ziegler Belgian Patent No. 533,362) or by using radiation, etc. Exemplary of the transition metal compounds are the halides such as the halides of titanium, zirconium, hafnium, thorium, uranium, vanadium, columbium, tantalum, chromium, molybdenum, tungsten, and mixtures thereof. The Ziegler-type catalyst may be prepared by reducing a transition metal compound, such as titanium tetrachloride, titanium tetrabromide, zirconium tetrachloride, and the like, by admixing with a reducing agent such as an aluminum alkyl or other reducing organo-metallic compounds or by starting with a prereduced transition metal compound such as titanium trichloride or titanium dichloride.

The organo-metallic compound acts as the activator component of the catalyst. As mentioned above, the organo-metallic compound is sometimes used both as a reducing agent and as the activator component of the catalyst. Exemplary of the organo-metallic compounds are the alkyl or aryl derivatives of Groups I–III metals, such as butyllithium, phenylsodium, diethyl magnesium, diethyl zinc, and the like. Preferred are the aluminum alkyl such as triethylaluminum, triisobutylaluminum, diethylaluminum chloride, ethylaluminum dichloride, diisobutylaluminum bromide, ethylaluminum propoxide, diethylaluminum hydride, and the like.

A preferred catalyst of the above type and one of the most active ws found to be crystalline titanium trichloride cocrystallized with aluminum chloride. The cocrystallized material is used together with an aluminum alkyl, e.g., triethylaluminum. The preferred catalyst has been prepared by a number of methods; see, for example, U.S. Patent Nos. 3,032,509; 3,032,511; 3,032,513; and 3,128,252 to A. W. Langer, Jr., and E. Tornquist. Other catalysts which are suitable are titanium trichloride and triethylaluminum.

It is understood that the organo-metal-transition metal catalysts used in the polymerization of the present invention may be modified by a third component. The third component is used primarily to improve the stereoregularity of the polymer produced. Such third component materials may be certain Lewis bases, ammonium salts, or coordinate-covalent compounds such as hexamethylphosphoramide, tetrabutylammonium chloride, and the like.

Heretofore, a phenolic compound has not been successfully copolymerized with an alpha-olefin when employing a Ziegler-type catalyst due to the polar hydroxyl group of the phenol reacting with the catalyst. According to the present invention, alkenyl hindered phenols which will copolymerize with alphaolefins have been synthesized having the following formula:

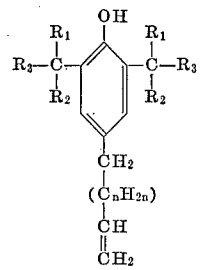

Where:
$n = 1$ to $12$
$R_1 = -CH_3$
$R_2 =$ Alkyl of 1 or 2 carbon atoms
$R_3 =$ Alkyl of 1 to 5 carbon atoms The alkenyl hindered phenols which may be used in the copolymerization process are illustrated by 4-(but-3-enyl)-2,6-di-t-butyl phenol; 4-(pent-4-enyl)-2,6-di-t-butyl phenol; 4-(oct-7-enyl)-2,6-di-t-butyl phenol; and 4-(but-3-enyl)-2,6-di-t-amyl phenol; and 4-(but-3-enyl)-2,6-di[2-(2-methyl heptyl)]phenol.

The term "alkenyl hindered phenol" will be used in this application to refer to a phenolic compound which has the following characteristics:

An alkenyl group para to the hydroxyl group and which has the following structure:

$$-CH_2-(C_nH_{2n})-CH=CH_2$$

and is substituted in the ortho positions to the hydroxyl group with an alkyl group having an alpha-tertiary carbon.

The synthesis of the alkenyl hindered phenols of the present invention may be illustrated by the following reactions:

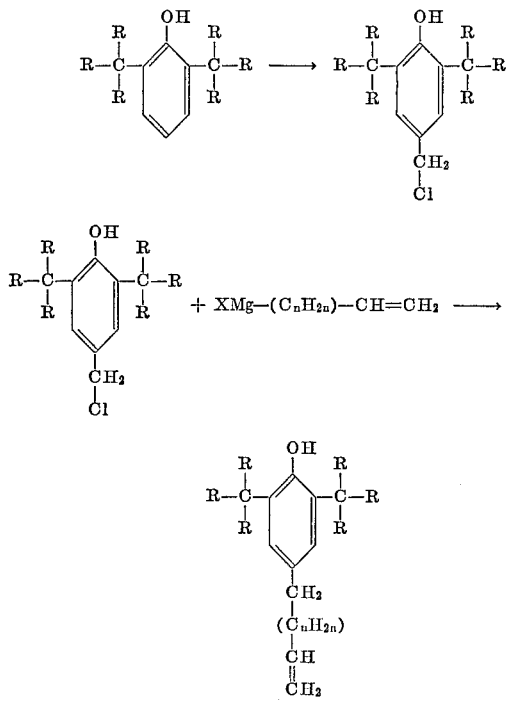

Where:
R = a lower alkyl
n = 1 to 12
X = I, Br, Cl

Thus, starting with the di-ortho-hindered phenol, the first step in the synthesis is to form the desired para halomethyl-di-ortho hindered phenol. The resulting para-halomethyl-di-ortho hindered phenol is then reacted with the Grignard reagent made from an alpha-halo-omega-mono-olefin. This reaction results in the synthesis of the desired alkenyl hindered phenols of the present invention. For example, a 2,6-di-tertiary-butyl phenol may be chloromethylated to form the 2,6-di-tertiary-butyl-4-chloromethyl phenol. The chloromethylated phenol is reacted with a Grignard reagent prepared by mixing an alpha-halo-omega-mono-olefin and magnesium to form a Grignard reagent having a formula $$XMgC_nH_{2n}-CH=CH_2$$

where X is a halogen such as iodine, bromine, or chlorine. The Grignard reagent reacts with the haloalkylated phenol to form the alkenyl hindered phenol of the present invention. The foregoing is one of the possible syntheses which may be used to produce the alkenyl hindered phenols of the present invention.

The copolymerization according to the present invention may be carried out in a wide variety of ways. The copolymerization process may be a batch of continuous operation. It is preferred to carry out the copolymerization in an inert liquid organic diluent as the reaction medium. The inert liquid organic diluent may be an aliphatic hydrocarbon such as hexane, heptane; a cycloaliphatic hydrocarbon such as cyclohexane; an aromatic hydrocarbon such as xylene; or other known inert organic diluents or mixtures of such hydrocarbons.

The selection of the temperature and pressure used for the copolymerization process will depend upon the activity of the catalyst being used and the diluent used. In general, the copolymerization may vary over a wide range of temperatures and pressures. Using the preferred catalysts which may be represented as $$TiCl_3 \cdot 1/3AlCl_3 + AlEt_3$$

and $TiCl_3 + AlEt_3$, the temperature may range from about 30° to 150° C., preferably from 50° to 100° C. at a pressure of 1 to 10 atmospheres. A particularly suitable condition for the copolymerization is 50–70° C. at one atmosphere.

According to the prior art, polar compounds such as alcohol, water, acetone, etc., have been used in polymerization processes using Ziegler-type catalysts to quench the polymerization mixture when the desired degree of polymerization has been reached. The polar compounds have been used because they destroy the catalyst. According to the present invention an alkenyl hindered phenol, which is an alkenyl phenol wherein the polar hydroxyl group is sterically hindered, is copolymerized with an alpha-olefin in the presence of a Ziegler-type catalyst without destroying the catalyst. It has been found according to the present invention that a Ziegler-type catalyst will not be destroyed if the hydroxyl group is sufficiently sterically hindered.

The alpha-olefin monomers used in the copolymerization process of the present invention are selected from the alpha-olefins having 2 to 10 carbon atoms. The preferred alpha-olefin is propylene. Other suitable alpha-olefins which may be used are ethylene; 1-butene; 1-pentene; 4-methyl-1-pentene; 1-hexene; 4-methyl-1-hexene; 5-methyl-1-hexene; and the like. A mixture of two or more of the above monomers may be used according to the present invention. That is, a terpolymer of, for example, ethylene, propylene, and the alkenyl hindered phenol may be prepared by a batch or continuous process employing single or multiple series reactors.

A "copolymer" as used in this application is defined as on page 36 of Flory's Principles of Polymer Chemistry, Cornell University Press (1953), which states:

"Polymeric substances containing two or more structural units combined more or less in random sequence are then distinguished by the term copolymer."

The copolymers of the present invention are characterized by the alkenyl hindered phenol monomers and the alpha-olefin monomers.

The copolymers of this invention may be blended with alpha-olefin homopolymers or copolymers to obtain a variety of new compositions. For example, homopolymers of ethylene or propylene or copolymers of ethylene and propylene may be blended with the copolymer of this invention so long as the amount blended does not unduly minimize the superior properties for the use intended.

The invention will be further illustrated by the following specific examples which are given by way of illustration and not as limitations on the scope of the invention.

EXAMPLE 1

A suspension of paraformaldehyde, 186.6 g. (6.22 moles), in 680 ml. benzene was prepared. A solution of 2,6-di-t-butyl phenol, 515 g. (2.5 moles), in 85 ml. of benzene was also prepared. The paraformaldehyde suspension was saturated with anhydrous HCl and the suspension heated to 50° C. To the suspension was added the 2,6-di-t-butyl phenol solution at the rate of 3–5 drops per second with rapid stirring and continued addition of HCl. The addition of HCl was continued for about 4½ hours at 50–55° C. The reaction mixture was then cooled and poured into water. The resultant product was washed with dilute HCl and then twice with water. The organic layer was dried over $CaCl_2$. After evaporation of the benzene, 500 g. (78.7% yield) of 4-chloromethyl-2,6-di-t-butyl phenol was obtained. The crude product may be distilled and the pure compound collected at 140° C. and 1.5 mm. pressure.

EXAMPLE 2

The Grignard reagent was prepared in the normal manner using 27 g. of magnesium turnings; 133 g. of allyl bromide; and 800 ml. of ether. The allyl bromide was mixed with anhydrous ether to form a solution to which the magnesium turnings, which were also in anhydrous ether, were added. A crystal of iodine initiated the reaction. To 200 ml. of anhydrous ether was added 87 g. of 4-chloromethyl-2,6-di-t-butyl phenol. The 4-chloromethyl-2,6-di-t-butyl phenol was added dropwise to the Grignard reagent at a rate to maintain gentle refluxing. After the material was completely added, the reaction solution was heated at reflux temperature for an additional hour. Then, the reaction solution was hydrolyzed by adding cold aqueous ammonium chloride solution. The ether layer was separated and dried over an anhydrous sodium sulfate. After evaporation of the ether, the product was distilled and gave 46.2 g. (56% yield) of 4-(but-3-enyl)-2,6-di-t-butyl phenol at a boiling point of 112–114° C./0.46 mm. The structure of the product was confirmed by NMR.

EXAMPLE 3

Similarly as in Example 1, 2,6-di-t-amyl phenol prepared by the reaction of isoamylene with phenol in the presence of aluminum phenoxide is chloromethylated to give the 4-chloromethyl-2,6-di-t-amyl phenol.

Similarly as in Example 2, the chloromethylated 2,6-di-t-amyl phenol is reacted with allyl magnesium bromide to give 4-(but-3-enyl)-2,6-di-t-amyl phenol.

EXAMPLE 4

A Grignard reagent is prepared in the same manner as described in Example 2 except 4 - bromo 1 - butene is used rather than allyl bromide. The 4 - chloromethyl-2,6,-di-t-butyl phenol is added to the Grignard reagent prepared and after work up yields the 4-(pent-4-enyl)-2,6,-di-t-butyl phenol.

EXAMPLE 5

A Grignard reagent is prepared in the same manner as Example 2 using 5 - bromo - 1 - pentene rather than the allyl bromide. The 4 - chloromethyl - 2,6 - di-t-amyl phenol prepared as in Example 3 is added to this Grignard reagent made from magnesium and the 5 - bromo - 1-pentene to yield 4-(hex-5-enyl)-2,6-di-t-amyl phenol.

The foregoing examples are exemplary only of preparing the alkenyl hindered phenols which may be synthesized and used as monomers for the copolymerization process of the present invention. The following examples are illustrative of the copolymerization process.

EXAMPLE 6

Aluminum triethyl (4 mmoles) was added to 400 ml. dry xylene in a nitrogen atmosphere. Then, to the solution was added 2 mmoles of $TiCl_3 \cdot 1/3AlCl_3$. A few minutes later, propylene was passed through the stirred solution at a rate of 0.55 g. per minute and heated. The temperature increased to 60° C., and then 4 - (but-3-enyl) - 2,6 - di-t-butyl phenol (1 g.) in 15 ml. xylene was added to the reaction mixture. The reaction temperature was kept at 60° C. for the duration of the reaction. Fifteen minutes after the addition of the hindered phenol, the flow of propylene was stopped because the pressure in the reactor had increased to 12.4 p.s.i. After 16 minutes the pressure fell to 7.4 p.s.i. and the propylene addition was resumed for 5 minues more. After 84 minutes, the reaction was stopped. The polymer was precipitated by adding methanol to the slurry. The polymer weighed 20 g. (90.9% yield).

| | |
|---|---:|
| Intrinsic viscosity | 2.98 |
| Molecular weight | 392,000 |
| Ether solubles _____percent__ | 1.32 |
| Heptane insolubles _____do____ | 86.1 |
| DTA melting point _____° C__ | 165 |

The presence of 0.075 weight percent of 4 - (but-3-enyl) - 2,6 - di-t-butyl phenol in the copolymer was determined by ultraviolet spectroscopy.

Only 1.65 percent of the alkenyl hindered phenol had copolymerized with the propylene.

Methanol extraction did not reduce the concentration of the alkenyl hindered phenol in the product. The alkenyl hindered phenol is completely soluble in methanol. Therefore, the alkenyl hindered phenol was copolymerized with the propylene.

EXAMPLE 7

The procedure was the same as in Example 6 except stainless steel baffles were added to the reactor.

The following was charged to the reactor:

| | |
|---|---:|
| $AlEt_3$ _____mmoles__ | 8 |
| $TiCl_3 \cdot 1/3AlCl_3$ _____do____ | 4 |
| Xylene _____ml__ | 450 |
| 4-(but-3-enyl)-2,6-di-t-butyl phenol _____g__ | 1.55 |
| Propylene _____g__ | 35.75 |

The reaction temperature was 55° C. and the reaction yielded 29.1 g. (81.5%) of the copolymer.

| | |
|---|---:|
| Ether solubles _____percent__ | 15.5 |
| Heptane insolubles _____do____ | 71.3 |
| DTA melting point _____° C__ | 164 |
| Intrinsic viscosity _____ | 3.03 |

The polymer contained 0.12 weight percent of the alkenyl hindered phenol. Only 2.25 percent of the hindered phenol was copolymerized with propylene.

Analysis of the polymer after extraction with heptane showed that the heptane insoluble polymer contained 0.065 percent of the hindered phenol while the heptane soluble polymer contained 0.4 percent of the phenol.

EXAMPLE 8

In this example, the alkenyl hindered phenol was mixed with aluminum triethyl before adding it to the polymerization reaction mixture. The general procedure was identical to Example 6, except the following was added to the reactor:

| | |
|---|---:|
| $AlEt_3$ _____mmoles__ | 4 |
| $TiCl_3 \cdot 1/3AlCl_3$ _____do____ | 2 |
| Xylene _____ml__ | 450 |
| Propylene (0.72 mole) _____g__ | 30.2 |
| A solution of 4-(but-3-enyl)-2,6-di-t-butyl phenol 1.16 g. _____mmoles__ | 3.75 |
| $AlEt_3$ (in about 8 ml. xylene) _____do____ | 4 |

The catalysts were added to the xylene in the usual way. Then, propylene was added and the reaction temperature maintained at 50° C. After 10 minutes, the xylene solution of the hindered phenol and the aluminum triethyl were added. After completion of the reaction, the polymer was isolated in the usual way.

| | |
|---|---|
| Yield (77%) _____g__ | 23.4 |
| Intrinsic viscosity _____ | 3.67 |
| Ether solubles _____percent__ | 14.94 |
| Heptane insolubles _____do____ | 72.8 |
| DTA melting point _____° C__ | 159 |

The copolymer contained 0.007 weight percent of the alkenyl hindered phenol by U.V. analysis.

EXAMPLE 9

The general procedure was the same as in Example 6. Reaction temperature was 60° C. The catalyst used contained hexamethylphosphoramide (HMPA) as a third component. The reactor was charged with the following but was dirty and responsible for low yield:

| | |
|---|---|
| $AlEt_3 \cdot HMPA(2:1)$ _____mmoles $AlEt_3$__ | 4 |
| $TiCl_3 \cdot 1/3 AlCl_3$ _____mmoles__ | 2 |
| 4-(but-3-enyl)-2,6-di-t-butyl phenol _____g__ | 5 |
| Propylene _____g__ | 19.2 |

The yield of copolymer was 13.6 g. (70.9%).

| | |
|---|---|
| Ether solubles _____percent__ | 10.95 |
| Heptane insolubles _____do____ | 81.57 |
| Intrinsic viscosity _____ | 5.35 |
| Percent hindered, phenol in polymer _____wt. percent__ | 0.28 |

EXAMPLE 10

The reaction conditions were the same as in Example 6. Reaction temperature was 50° C. The alkenyl hindered phenol was added in two equal portions. The first half was added 10 minutes after the addition of propylene was started, and the second half was added 15 minutes after the first half was added.

| | |
|---|---|
| $AlEt_3$ _____mmoles__ | 4 |
| $TiCl_3 \cdot 1/3 AlCl_3$ _____do____ | 2 |
| Xylene _____ml__ | 450 |
| Propylene _____g__ | 55 |
| 4-(but-3-enyl)-2,6-di-t-butyl phenol (in 12 ml. xylene) _____g__ | 3.10 |

The yield of copolymer was 53.6 g. (97.4%).

| | |
|---|---|
| Intrinsic viscosity _____ | 4.78 |
| Heptane insolubles _____percent__ | 75.61 |
| Ether solubles _____do____ | 15.4 |
| Percent alkenyl hindered phenol copolymerized _____wt. percent__ | 0.11 |

Therefore, 1.9 percent of alkenyl hindered phenol copolymerized with propylene.

EXAMPLE 11

The procedure was the same as in Example 6; however, hydrogen-reduced $TiCl_3$ was used instead of aluminum-reduced $TiCl_3$. The following were charged to the reactor:

$TiCl_3 \cdot HA$ ($TiCl_3 \cdot HA$=hydrogen activated)

| | |
|---|---|
| mmoles__ | 2 |
| $AlEt_3$ _____do____ | 4 |
| Xylene _____ml__ | 450 |
| 4-(but-3-enyl)-2,6-di-t-butyl phenol (in 20 ml. xylene) _____g__ | 4.7 |
| Propylene _____g__ | 22.5 |

The usual procedure was followed; the reaction temperature was 70° C.

The yield of copolymer was 19 g. (84.4%).

| | |
|---|---|
| Intrinsic viscosity _____ | 3.95 |
| Ether solubles _____percent__ | 13.1 |
| Heptane insolubles _____do____ | 78.4 |

The copolymer contained less than 0.03 weight percent of the alkenyl hindered phenol.

The foregoing examples are illustrative of the present copolymerization process. Also the examples illustrate various copolymers with varying weight percent of the alkenyl hindered phenol. The amount of alkenyl hindered phenol in the copolymers of the present invention may vary from 0.005 to 2.0 weight percent. Copolymers having between 0.007 and 0.5 weight percent alkenyl hindered phenol have shown outstanding thermal and oxidative stability without the addition of any stabilizers.

The present invention will be further illustrated by the following data which are given by way of illustration. The copolymers of the present invention were tested to determine their oxidative stability. By one method, about 10 cc. of the copolymer pellets were placed in a small glass tube and placed in a static air oven at 80° C. The other method was to place about 1 g. of the copolymer pellets in a glass U-tube which was placed in a bath at 150° C. Air was passed through the U-tube. In both methods, the evidence of cracks and crazing or a fiable polymer determined oxidative failure. The results of the tests are set forth in Table I which follows.

TABLE I

| | 4-(but-3-enyl)-2,6-di-t-butyl phenol, Wt. Percent | Oxidative Stability | |
|---|---|---|---|
| | | Static Air Oven 80° C., Days | U-Tube Air 150° C., Hrs. |
| Copolymer Example: | | | |
| 11 | 0.03 | 604 | |
| 6 | 0.075 | 583 | |
| 10 | 0.11 | a(1,332) | 16 |
| 7 | 0.12 | a(1,352) | |
| 9 | 0.28 | a(1,352) | 49 | a Still on test with no evidence of failure (5/22/68).

To illustrate the effectiveness of the stability of the copolymers of the present invention, data is set forth in Table II below wherein 4-methyl-2,6-di-t-butyl phenol was admixed with polypropylene and tested in the same manner as the copolymers of the present invention. The data shows that the copolymer is far more stable than an equivalent amount of the admixed hindered phenol in polypropylene. The results illustrate the problem of volatility of admixed phenols. Further, the results give evidence to the fact that the alkenyl hindered phenol portion of the copolymer is effectively located in the copolymer from the standpoint of oxidative and thermal stability.

TABLE II

| Homopolymer | 4-methyl-2,6-di-t-butyl phenol, Wt. Percent | Oxidative Stability | |
|---|---|---|---|
| | | Static Air Oven 80° C., Days | U-Tube Air 150° C., Hrs. |
| Polypropylene | None | 25 | 1 |
| Do | 0.03 | 284 | |
| Do | 0.075 | 475 | |
| Do | 0.11 | 710 | 2 |
| Do | 0.12 | 790 | |
| Do | 0.28 | | 4 |

It is obvious from the foregoing that the copolymers of the present invention possess characteristics which are not present in the homopolymer of the mono-olefin monomer used in producing the copolymer. The copolymers of the present invention would have utility in the many applications for polymers, especially polyolefins, wherein the operating conditions are such that a nonvolatile stabilizing system is required. Thus, parts for the inside of dishwashers, driers, electrical equipment, etc., all require a polymer having a nonvolatile stabilizing system.

The nature and objects of the present invention having been completely described and illustrated and the best mode thereof set forth, what we wish to claim as new and useful and secure by Letters Patent is:

1. A copolymer of a monoalpha-olefin having 2 to 10 carbon atoms and between 0.005 and 2.0 weight percent of an alkenyl hindered phenol having the following formula:

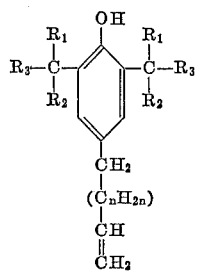

where
$n = 1$ to 12
$R_1 = -CH_3$
$R_2 =$ alkyl of 1 to 2 carbon atoms
$R_3 =$ alkyl of 1 to 5 carbon atoms.

2. A copolymer according to claim 1 wherein said mono-olefin is propylene.

3. A copolymer according to claim 1 wherein said alkenyl hindered phenol is 4-(but-3-enyl)-2,6-di-t-butyl phenol.

4. A copolymer according to claim 1 wherein said mono-olefin is propylene and said alkenyl hindered phenol is 4-(but-3-enyl)-2,6-di-t-butyl phenol.

5. A copolymer according to claim 1 wherein said alkenyl hindered phenol is present in an amount between 0.007 and 0.5 weight percent.

6. An alkenyl hindered phenol having the following formula:

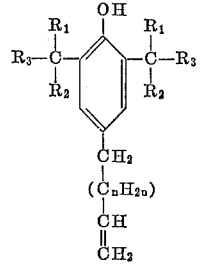

where:
$n = 1$ to 12
$R_1 = -CH_3$
$R_2 =$ alkyl of 1 to 2 carbon atoms
$R_3 =$ alkyl of 1 to 5 carbon atoms.

7. A phenol according to claim 6 wherein $R_2$ and $R_3$ are methyl.

8. A phenol according to claim 6 wherein $R_2$ is methyl and $R_3$ is ethyl.

9. A phenol according to claim 7 wherein $n$ is 1.

10. A phenol according to claim 8 wherein $n$ is 1.

References Cited

UNITED STATES PATENTS 3,062,784  11/1962  Tocker _____ 260—62
3,320,116   5/1967  Tocker _____ 161—252

OTHER REFERENCES

Kitchen, L. J., et al., Ind. and Eng. Chem., 42 (1950), p. 676.

Hawkins et al., J. Polymer Sci. 41 (1959), p. 5.

Volod' Kin, A. A., et al., Izvestiya Akad. Nauk SSSR, Ser. Khim., No. 12, pp. 2188–2190 (2150–2152 translation).

JOSEPH L. SCHOFER, Primary Examiner

C. A. HENDERSON, Jr., Assistant Examiner

U.S. Cl. X.R.

260—624